United States Patent
Woergaard

(10) Patent No.: US 10,816,479 B2
(45) Date of Patent: Oct. 27, 2020

(54) OPTICAL CHARACTERIZATION SYSTEM FOR A PROCESS PLANT

(71) Applicant: Nemewo ApS, Stege (DK)

(72) Inventor: Christian Woergaard, Jyllinge (DK)

(73) Assignee: PROXY ENGINEERING APS, Stege (DK)

( * ) Notice: Subject to any disclaimer, the term of this patent is extended or adjusted under 35 U.S.C. 154(b) by 295 days.

(21) Appl. No.: 15/543,003

(22) PCT Filed: Jan. 13, 2016

(86) PCT No.: PCT/EP2016/050587
§ 371 (c)(1),
(2) Date: Jul. 12, 2017

(87) PCT Pub. No.: WO2016/113320
PCT Pub. Date: Jul. 21, 2016

(65) Prior Publication Data
US 2018/0011028 A1    Jan. 11, 2018

(30) Foreign Application Priority Data
Jan. 13, 2015   (EP) .................................. 15150978

(51) Int. Cl.
*G01N 21/85*    (2006.01)
*G01N 15/06*    (2006.01)
(Continued)

(52) U.S. Cl.
CPC .............. *G01N 21/85* (2013.01); *G01N 1/38* (2013.01); *G01N 15/06* (2013.01); *G01N 21/05* (2013.01);
(Continued)

(58) Field of Classification Search
None
See application file for complete search history.

(56) References Cited

U.S. PATENT DOCUMENTS

| 4,178,796 A | 12/1979 | Zwicker et al. |
| 5,809,825 A | 9/1998 | Howard |

(Continued)

FOREIGN PATENT DOCUMENTS

| GB | 884863 A | 12/1961 |
| WO | WO 2004/034035 A1 | 4/2004 |
| WO | WO 2013/022795 A1 | 2/2013 |

OTHER PUBLICATIONS

International Search Report corresponding to co-pending PCT Patent Application Serial No. PCT/EP2015/050587, European Patent Office, dated Mar. 31, 2016; (4 pages).
(Continued)

*Primary Examiner* — Paul S Hyun
(74) *Attorney, Agent, or Firm* — Nixon Peabody LLP

(57) ABSTRACT

A characterization system for performing optical characterization of a liquid sample in a process plant. The system includes a sample section for holding the liquid sample, an inlet having an inlet valve controlling a flow of the liquid sample into the sample section, an outlet having an outlet valve controlling a flow of the liquid sample out of the sample section, a pressurizer pressurizing the sample section, an agitator agitating the liquid sample inside the sample section when pressurized, a measuring device performing optical characterization of the liquid sample inside the sample section while the liquid sample is pressurized and agitate. The inlet and outlet valves are connected to a line pipe, and the system receives the liquid sample from the line pipe through the inlet valve, characterizes the liquid sample, and returns at least a part of the liquid sample to the line pipe through the outlet valve.

17 Claims, 6 Drawing Sheets

Figure 1:
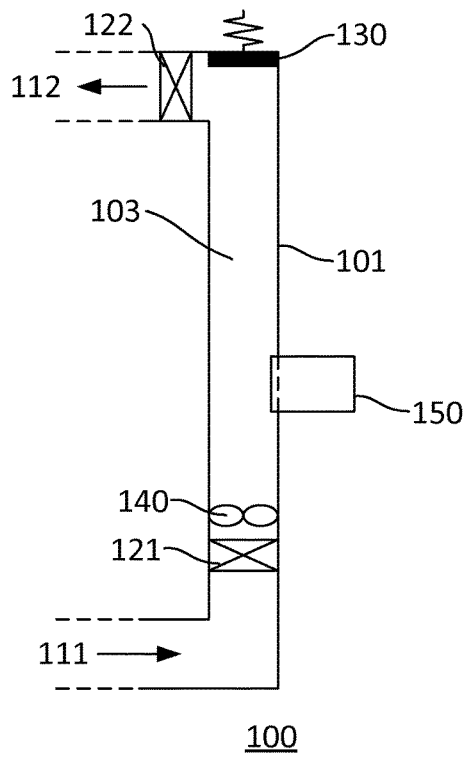

(51) Int. Cl.
*G01N 21/05* (2006.01)
*G01N 1/38* (2006.01)
*G01N 15/00* (2006.01)

(52) U.S. Cl.
CPC ............... *G01N 2015/0053* (2013.01); *G01N 2015/0693* (2013.01)

(56) References Cited

U.S. PATENT DOCUMENTS

| | | |
|---|---|---|
| 5,831,721 A | 11/1998 | Alkafeef |
| 5,879,619 A * | 3/1999 | Ueda .................... C22C 38/42 148/442 |
| 6,083,461 A | 7/2000 | Tompkins et al. |
| 6,297,505 B1 | 10/2001 | Frandsen et al. |
| 2014/0160463 A1 | 12/2014 | Trainoff |
| 2016/0258875 A1* | 9/2016 | Pearl .................... E21B 49/087 |

OTHER PUBLICATIONS

Written Opinion corresponding to co-pending PCT Patent Application Serial No. PCT/EP2015/050587, European Patent Office, dated Mar. 31, 2016; (6 pages).

\* cited by examiner

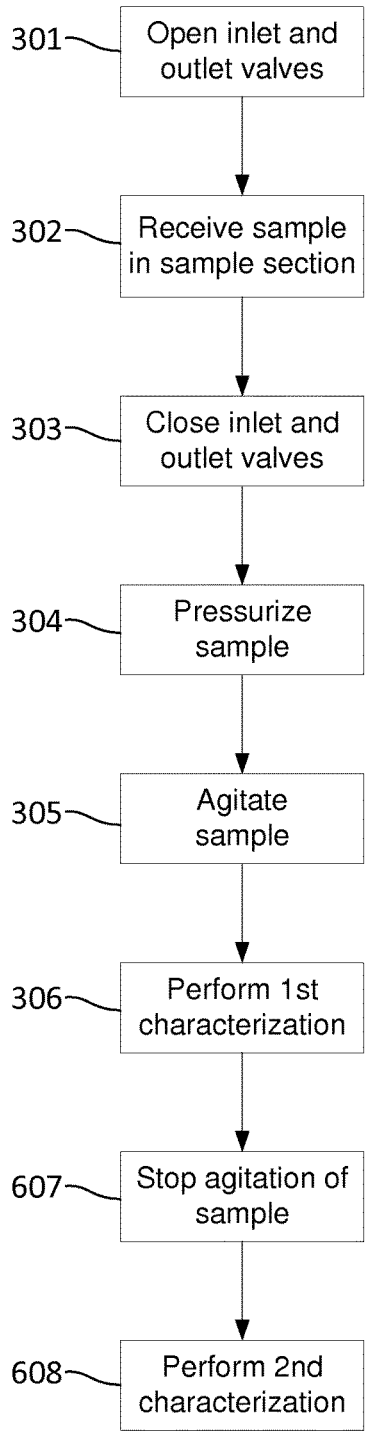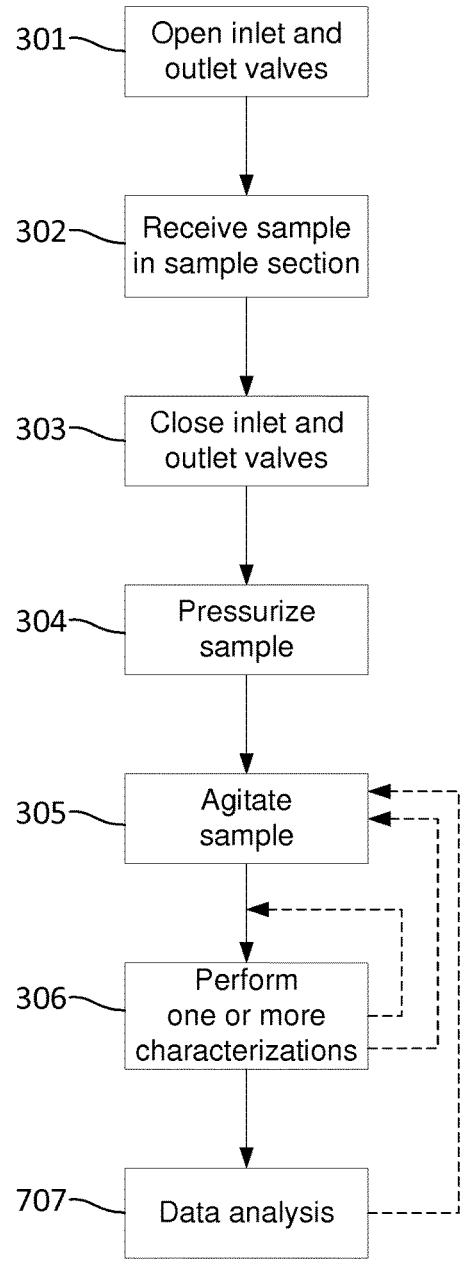
Fig. 6
Fig. 7

OPTICAL CHARACTERIZATION SYSTEM FOR A PROCESS PLANT

CROSS-REFERENCE TO RELATED APPLICATIONS

This application is a U.S. National Stage of International Application No. PCT/EP2016/050587, filed Jan. 13, 2016, which claims the benefit of European Patent Application No. 15150978.3, filed Jan. 13, 2015, both of which are incorporated herein by reference in their entireties.

TECHNICAL FIELD

The present invention relates to an optical characterization system and process for use in characterizing liquids used or produced in a process plant.

BACKGROUND OF THE INVENTION

In process plants, different ingredients are transported, typically through pipes, to undergo transformation into one or more products. Under certain conditions, the transporting and transformation process(es) are subject to production challenges originating from changes in process conditions. It may therefore be important to monitor the properties of ingredients, products, and/or their flows through the plant. In one scenario, an abnormal product, perhaps a clog, may form during production and cause a production stop for instance due to malfunction of an apparatus receiving the clog downstream. As another example, adjusting a production process is often no simple matter. Unexpected adverse effects might cause damage to the process plant. Monitoring the ingredients, flows and/or products in a simple, preferably partly or wholly automated, manner would be very advantageous for instance for the purpose of avoiding one or more of the problems described above.

U.S. Pat. No. 6,083,461 discloses a reaction cell system for measurement of catalyst demand where the system includes a spherical chamber having an inlet with a diametrically opposed outlet where an optical cylinder traverses the spherical chamber above an agitator maintained at the bottom thereof.

U.S. Pat. No. 4,178,796 discloses an on-line particle size analyzer which is able to take measurements on material flowing along a line in real time and thus enable automatic process controls to be effected.

U.S. Pat. No. 5,831,721 relates to back scattered laser light measurement techniques for the measurement of particle size distribution in a fluid being particularly suited for measurement of sub-micron particle size distribution in fluids such as petroleum fluids being colored or opaque and strongly absorptive of incident light. An optical transceiver partly immersed in the fluid provides measurement of particle size distribution while the fluid is subjected to conditions of high pressure and/or high temperature.

Disclosed is a container for receiving the fluid that is to have to its particle size distribution measured where the container comprises an upper inlet port and valve to permit fluid filling and a bottom outlet port and valve to permit fluid draining. The container also comprises a magnetic stirrer located at the bottom of a container.

Patent specification GB 884,863 relates to colorimetric type chemical analyzers having an expansible volume sample cell that is completely enclosed when its inlet and outlet means are closed.

U.S. Pat. No. 6,297,505 discloses relates to an on-line method and a flow system as well as a cuvette for carrying out IR spectrometry for analysis of liquid food products, possibly containing dissolved gases, in a process line in a liquid food product processing plant, especially a dairy processing milk and milk products. A liquid sample is extracted from the process line to a measuring branch and the sample is thermo-stated and passed to a measurement cuvette. The IR-absorbance spectrum is measured.

Patent application WO 2013/022795 discloses a bubble suppressing system for optical measurement cells containing a liquid sample where a pressure source is applied through a valve and flow impedance mechanism to the liquid contained within the cell to be dissolved back into the solution or be reduced in size such that optical measurements taken of the sample are more accurate and free of interference with the measurement beam and of measured stray light.

However, the mentioned systems are not all equally suited for providing optical characterization of opaque or nearly non-transparent or less-transparent liquids, e.g. comprising solid particles, in a reliable and/or reproducible fashion.

Additionally, the mentioned systems are not all equally suited for providing optical characterization of a liquid comprising solid particles where the presence of both relatively heavy and light particles will influence the optical characterization adequately. Likewise such systems are not all equally suited for providing optical characterization of a liquid comprising heterogeneous fluids.

SUMMARY OF THE INVENTION

It is an object to alleviate at least one or more of the above mentioned drawbacks at least to an extent.

A first aspect of the present invention provides a characterization system for performing optical characterization of a liquid sample in a process plant, comprising
  a sample section for holding the liquid sample,
  an inlet comprising an inlet valve adapted to control a flow of the liquid sample into the sample section,
  an outlet comprising an outlet valve adapted to control a flow of the liquid sample out of the sample section,
  a pressurizer adapted to pressurize the sample section,
  an agitator adapted to agitate at least a part of the liquid sample inside the sample section when the sample section is pressurized by the pressurizer,
  a measuring device adapted to perform optical characterization of the liquid sample inside the sample section while the liquid sample is pressurized and agitated, where the optical characterization is performed during or after agitation by the agitator,
wherein the inlet valve and the outlet valve are connected to a line pipe and the characterization system is adapted to receive the liquid sample from the line pipe through the inlet valve, characterize the liquid sample in the sample section, and optionally return at least a part of the liquid sample to the line pipe through the outlet valve.

A liquid sample comprises one or more liquids and may additionally comprise solid particles of one or more kinds, sizes, and shapes. It may also, in addition, comprise one or more colloids. Typically, a liquid in a process plant also comprises matter in a gaseous state, such as vapor of one or more of the liquids comprised in the liquid sample.

The measuring device might for instance be able to measure optical transmission, or optical reflection, or light scattering, or a combination of two or more of those properties. It may comprise one or more light sources, for instance lasers or LEDs, solely or in combination, and one or more detectors. The characterization system may also comprise more than one measuring device.

In some embodiments, the sample system comprises a substantially vertical pipe section. Alternatively, the sample section comprises a substantially horizontal or inclined pipe section.

Preferably, the agitator is placed in a lower half of the substantially vertical pipe section in such a way that by agitating the liquid sample with the agitator, at least some solid particles, if present in the liquid sample, is prevented from settling during the optical characterization. Preferably, the agitator sits, at least during some periods of operation, close to a lowest end of the substantially vertical pipe, the agitator having a closest part within 10 cm of the lowest end, such as within 5 cm of the lowest end, such as within 1 cm from the lowest end. This increases the likelihood that relatively large particles settle at the lowest end. If the substantially vertical pipe section comprises the inlet valve, the agitator preferably has a closest part, at least during some periods of operation, close to the inlet valve, for instance within 10 cm of the inlet valve, such as within 5 cm, such as within 1 cm of the inlet valve.

Preferably, the pressurizer can pressurize the sample section to at least 10 bar, such as to at least 20 bar, such as to at least 30 bar, such as to at least 40 bar. A high pressure reduces the amount of bubbles in the liquid sample. Such bubbles affect the optical characterization, and since the bubbles themselves are often not the subject of interest, their removal is preferred.

In some embodiments, the inlet valve and/or the outlet valve is/are a three-way valve. This allows matter to be combined in the sample section or direction of the liquid sample to more than one location upon optical characterization. A three-way valve shall be understood as valve having at least three ports.

In some embodiments, the sample section is (e.g. via a three-way valve) connected to a dilution agent reservoir or cleaning agent reservoir or flocculation agent reservoir or a catalytic agent reservoir or a chemical reaction agent reservoir to receive a corresponding agent. This allows e.g. for a dilution of the liquid sample before characterization, or initiation of flocculation by adding of a flocculation agent, etc. as described elsewhere.

In some embodiments, the sample section is connected to a traceability facility, the traceability facility being capable of receiving and storing at least a part of the liquid sample in connection with a unique identifier uniquely associated with optical characterization data obtained from the optical characterization performed on the liquid sample. The sample section may also be connected to a disposal reservoir for disposing of at least part of the liquid sample. The sample section could e.g. also be connected to the line pipe to return at least part of the sample thereto.

The optical characterization is performed while the liquid sample is agitated, i.e. in motion due to the agitator. Note that the agitator needs not be active (i.e. add kinetic energy to the liquid sample) during the optical characterization. However, more consistent results may be obtained when the optical characterization is performed during agitation by the agitator, which may therefore in some cases be preferable. If the agitator is stopped, the liquid sample will, sooner or later, come to a stop, and the ingredients of the liquid sample will be allowed to separate. A purpose of the agitator, however, is to ensure that the liquid sample is being well-mixed during the optical characterization. This is described in more detail later in this specification.

In some embodiments, the agitator comprises an open pipe element rigidly connected to a pressure element (e.g. in the form of propeller, blade, etc. elements or the like) that, when the agitator is submerged in a liquid and rotating around a rotation axis, can produce a pressure force having a non-zero force component parallel to the rotation axis. For instance, the agitator comprises one or more propelling blades for converting a part of the agitator's rotational energy to kinetic energy in the liquid sample, such as an equivalent to a ship's propeller or a wing of a wind mill.

In some embodiments, the agitator is adapted to provide a flow pattern being generally parallel to a rotational axis of the agitator and/or to a vertical axis of the sample section when the agitator is submerged in a liquid and rotating around the rotation axis of the agitator.

Basically a flow pattern is provided inside the sample section that provides forces (upwards and downwards) that are generally parallel to the rotational axis of the rotor and the vertical axis of the sample section (for embodiments where the sample section is generally a vertical cylindrical pipe or at least has a vertical extent being larger than its horizontal extent). This will ensure that all particles are brought in circulation in the sample section, generally regardless of their properties e.g. whether they are relatively heavy or light.

Even relative heavy particles will be brought in circulation and they may be moved even from locations near the bottom of the sample section where they otherwise would be. Additionally, relatively lighter particles are also brought in circulation and they may be moved from locations near/nearer the upper part of the sample section where they otherwise would be.

Furthermore, even quite heterogeneous fluids will be circulated.

Effectively, a substantially homogenous state of the fluid (including potential particles) is provided.

This ensures that even the relatively heavy and/or the relatively lighter particles will influence the characterization, which increases the reliability and the quality of the characterization.

Furthermore, the homogeneity enables reproducibility of measurements.

In some embodiments, the agitator comprises a central pipe having a, preferably central, through-going cavity, an outer cylindrical section enclosing the central pipe at a first, e.g. upper, end, a number of magnets allowing agitator to be rotated by use of a magnetic external driver, and one or more agitation or pressure elements (e.g. propeller, blade, etc.) adapted to provide a flow pattern being generally parallel to a rotational axis of the agitator when the agitator is rotated via the magnets, and wherein the central pipe and the through-going cavity are oriented along the rotational axis of the agitator. Such one embodiment is e.g. shown in FIG. 8.

In some embodiments, the system further comprises, or is connected to, at least one additional chamber being connected to the sample section via a further inlet valve allowing the controlled introduction of a flow of one or more given agents and/or one or more secondary liquids wherein at least one given additional chamber comprises a pressurizer adapted to pressurize a liquid in the given additional chamber. Such one embodiment is e.g. shown in FIG. 9.

A second aspect of the invention provides a process for performing optical characterization of a liquid sample in a process plant. The process comprises:

opening an inlet valve and an outlet valve,
receiving the liquid sample into a sample section between the inlet valve and the outlet valve, closing the inlet valve and the outlet valve,
pressurizing an inside of the sample section when the liquid sample is held in the sample section,
agitating, using an agitator, the liquid sample held in the pressurized sample section,
performing a first optical characterization of the liquid sample held in the pressurized sample section while the liquid sample is agitated during or after agitation by the agitator.

In some embodiments, the process further comprises performing a second optical characterization while the liquid sample is not under agitation. This allows for a more conventional characterization of the liquid sample.

In some embodiments, the second optical characterization is adapted to characterize a sedimentation and/or a flocculation process in the pressurized liquid sample. By stopping the agitator, the liquid sample may separate into different components. For instance, solid may settle or rise to a top end of the sample section, and immiscible liquids may separate. By performing one or more optical characterizations during or after the liquid sample is moving towards a steady state, information about the liquid sample's composition may be obtained.

The second optical characterization may alternatively be performed while the liquid sample is not stopped but at least under a lesser degree of agitation than under the first optical characterization.

In some embodiments, the process further comprising:
determine whether it is desired to add one or more secondary liquids or agents from one or more additional chambers after an initial optical characterization has been performed, and if desired then
pressurizing the liquid sample and the one or more secondary liquids or agents using two or more pressurizers,
determining the respective volumes of the liquid sample and the one or more secondary liquids or agents and afterwards ceasing pressurization,
displacing a predetermined amount of the liquid sample while the liquid sample is in a substantially homogeneous state as provided by using an agitator,
determining the volume of the liquid sample again while applying pressure by a pressurizer,
introducing the one or more secondary liquids or agents into the sample section filling a space made available due to the displacement resulting in a mixed liquid sample,
pressurizing the mixed liquid sample and the one or more secondary liquids or agents using two or more pressurizers,
determining the respective volumes of the mixed liquid sample and the one or more secondary liquids or agents and afterwards ceasing pressurization,
performing optical characterization, including agitation and pressurization, of the mixed liquid sample and use the result thereof to determine whether to repeat the steps again or stop.

The inventors have observed that in industry, and in the prior art in general, optical characterization of samples in process plants tend to be performed in a manner that quite readily makes sense to a human. For instance, to judge the quality of a water sample, the sample is often first allowed to rest whereby relatively heavy particles from the water settle. Then the resulting more clear water is characterized. To a person, the water might look cleaner in the sense that upon sedimentation and/or filtration, the water becomes more clear.

The inventors have seen that in many cases such optical measurement methods are at best useful, but often also not very precise or reproducible.

With the present invention, the inventors have taken a different approach to determining the properties of a liquid sample taken for instance from an industrial flow system in a process plant. Rather than await a sedimentation process to occur as part of characterizing the liquid sample, the inventors go in the opposite direction and actively agitate the liquid sample in order to obtain a homogenous mix in the sample section so that every element (e.g. whether being relatively heavy or light) will influence the characterization, which increase accuracy and reproducibility of optical characterization measurements.

Furthermore, the active agitation is done during pressurization so that gas bubbles are remove and also so no additional gas bubbles are generated due to agitation, which often may increase gas or bubble formation.

The present invention thus counteracts effects such as sedimentation. Also flotation can be reduced by agitating the liquid sample. The result of an optical characterization obtained might not be understandable in the same way. Instead it allows a consistent and reproducible observation of the optical properties of the liquid sample, allowing all liquid sample components to make their mark on the result of the optical characterization. Furthermore, because of the agitation, there is no downtime due to mechanical processes such as sedimentation or flotation because the entire measurement principle is based on the liquid sample being well-mixed, at least during certain times.

A third aspect of the invention provides hardware adapted to control a process in accordance with one or more embodiments of the second aspect of the invention, i.e. process for performing optical characterization of a liquid sample in a process plant. Such hardware may be dedicated hardware programmed specifically for the purpose, or it may be a general purpose computer executing software adapted to enable the controlling of the process.

A fourth aspect of the invention provides a software product that, when executed on suitable computing hardware, enables the computer hardware to control a process in accordance with one or more embodiments of the second aspect of the invention, i.e. process for performing optical characterization of a liquid sample in a process plant.

DEFINITIONS

All headings and sub-headings are used herein for convenience only and should not be constructed as limiting the invention in any way.

The use of any and all examples, or exemplary language provided herein, is intended merely to better illuminate the invention and does not pose a limitation on the scope of the invention unless otherwise claimed. No language in the specification should be construed as indicating any non-claimed element as essential to the practice of the invention.

This invention includes all modifications and equivalents of the subject matter recited in the claims appended hereto as permitted by applicable law.

BRIEF DESCRIPTIONS OF THE DRAWINGS

FIG. 1 schematically illustrates an embodiment of a system for performing optical characterization of a liquid sample.

Figure 2:
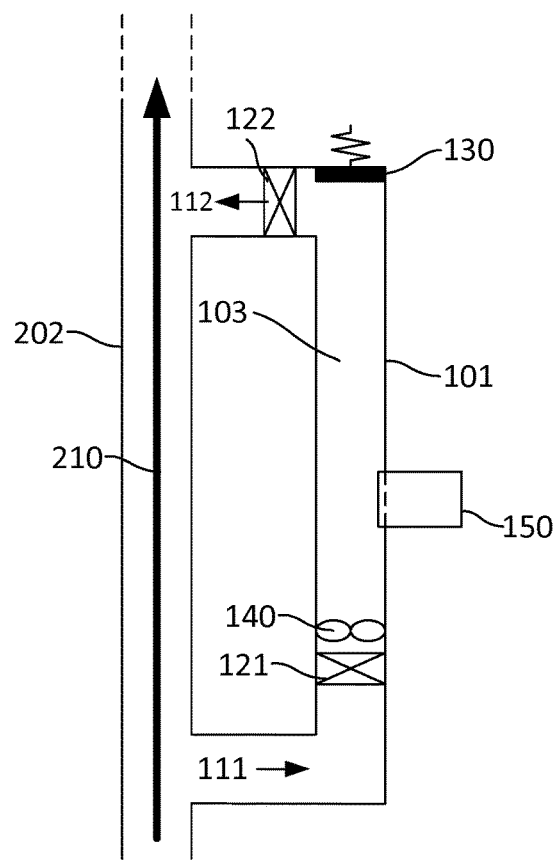

FIG. 2 schematically illustrates an embodiment of a system for performing optical characterization of a liquid sample, where the characterization system is connected to a production line.

Figure 3:
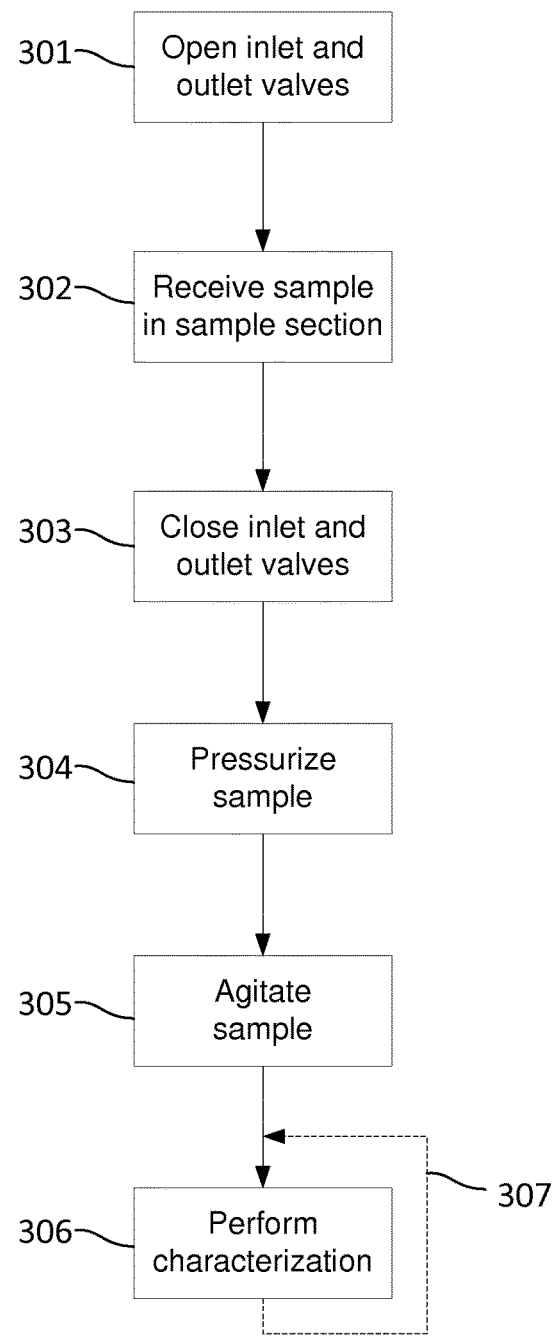

FIG. 3 schematically illustrates an embodiment of a process for performing optical characterization of liquid sample in a process plant.

Figure 4:
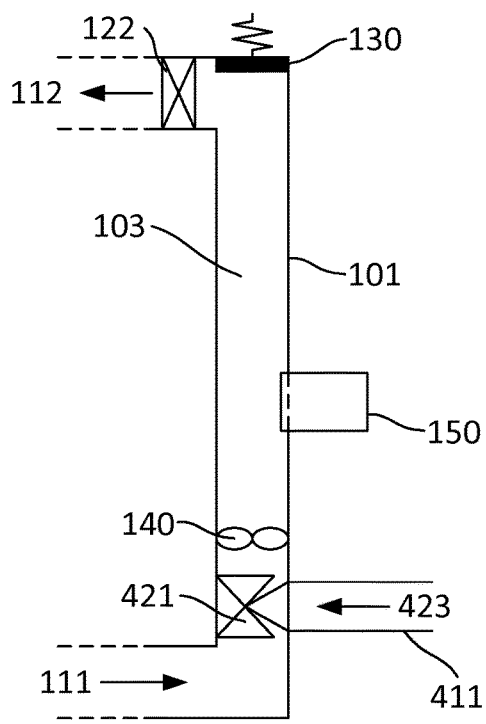

FIG. 4 schematically illustrates an embodiment of a characterization system in which the matter sample can be mixed with an agent.

Figure 5:
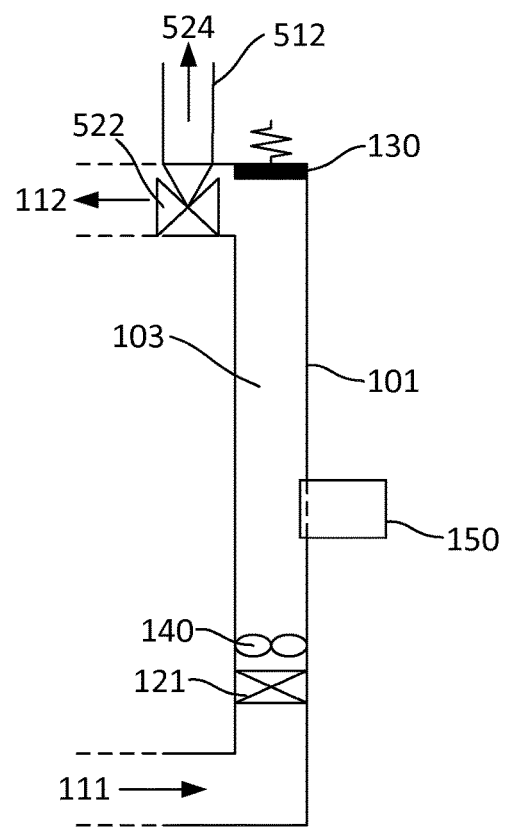

FIG. 5 schematically illustrates an embodiment of a characterization system in which the matter sample, upon characterization, can be transported to a separate reservoir.

FIG. 6 schematically illustrates an embodiment of a process for performing optical characterization of liquid in a process plant in which characterization is performed both under agitation and under no agitation.

FIG. 7 schematically illustrates an embodiment of a process for performing optical characterization of liquid in a process plant in which certain steps are repeated.

Figure 8:
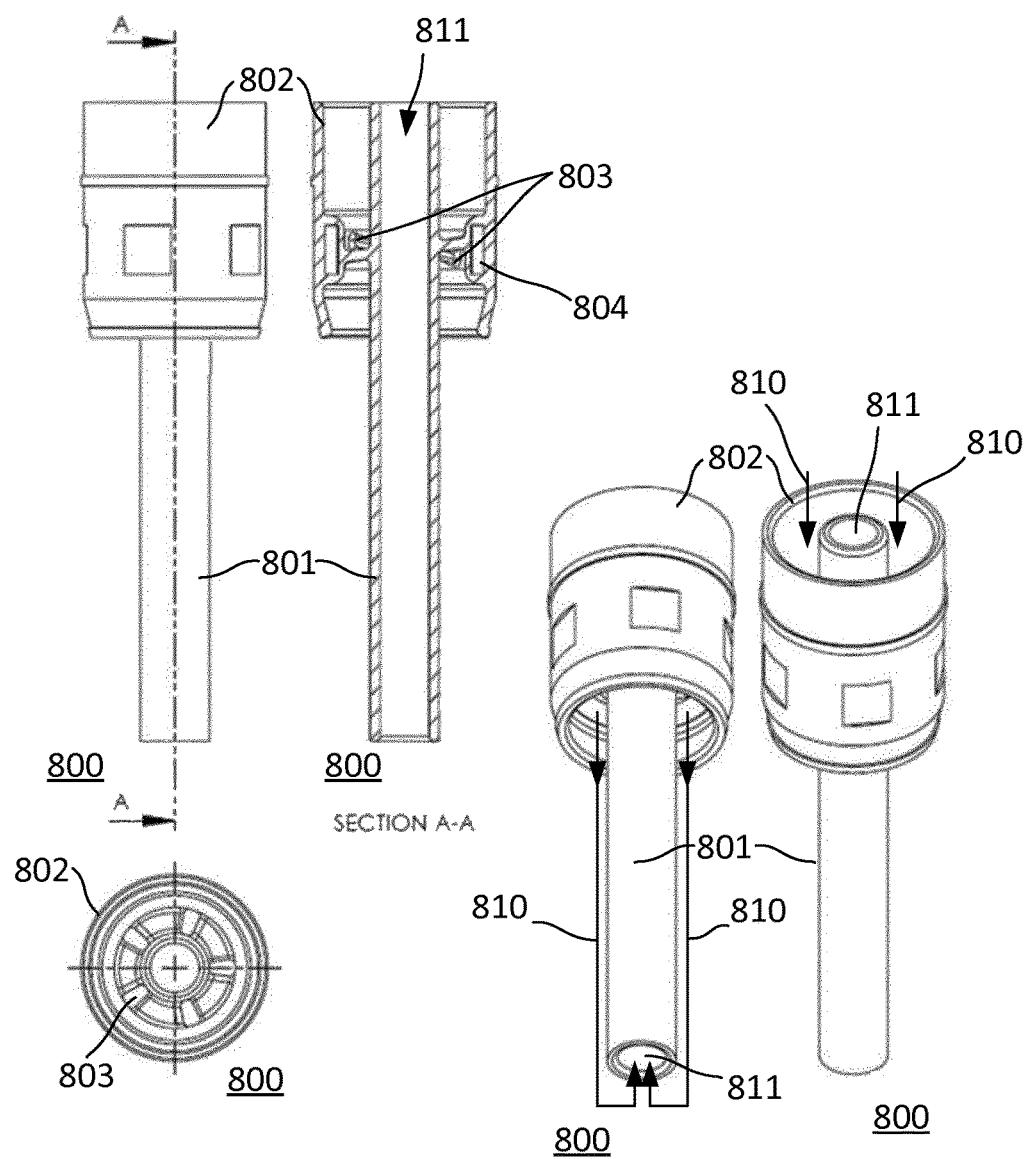

FIG. 8 schematically illustrates an agitator generally in the form of a rotor for use in a characterization system in accordance with the first aspect of the invention.

Figure 9:
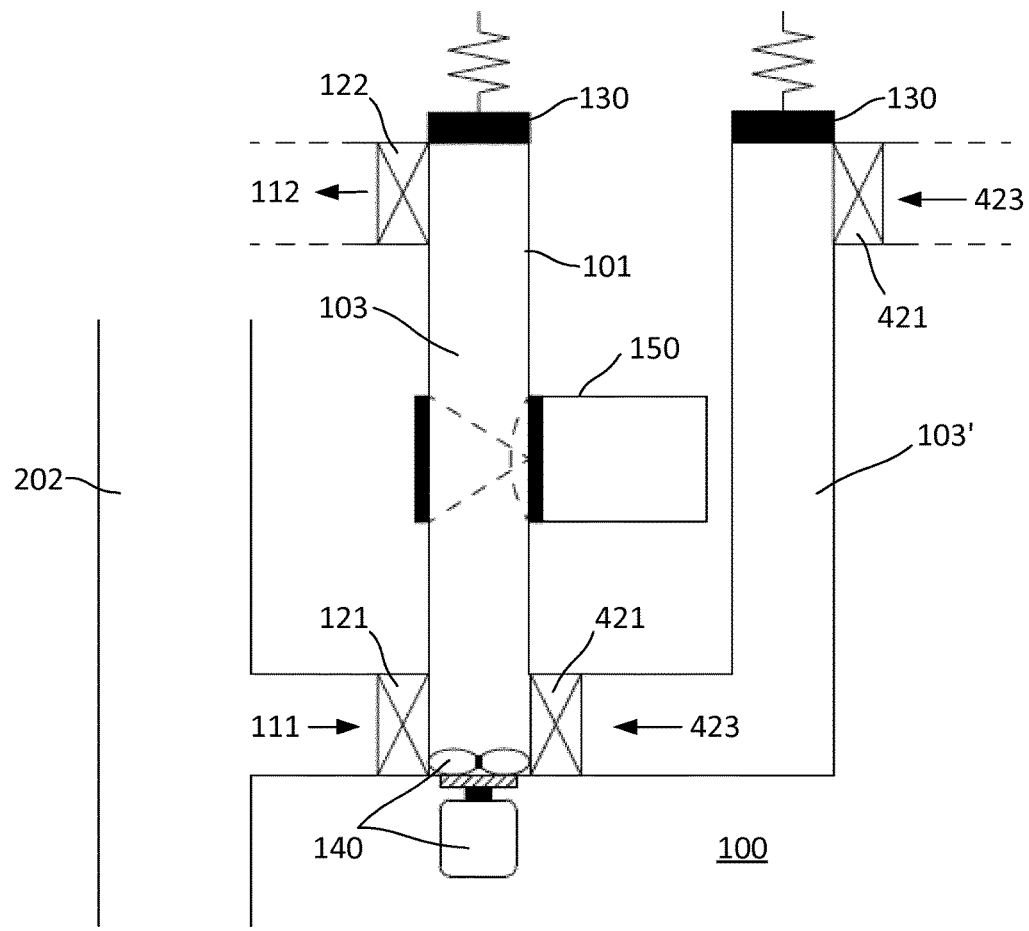

FIG. 9 schematically illustrates an alternative embodiment of a system for performing optical characterization of a liquid sample.

DETAILED DESCRIPTION OF SELECTED EMBODIMENTS

Various aspects and embodiments of a characterization system and a process for performing optical characterization of a liquid sample in a process plant as disclosed herein, will now be described with reference to the figures.

When/if relative expressions such as "top" and "bottom", "upper" and "lower", "right" and "left", "horizontal" and "vertical", "clockwise" and "counter clockwise" or similar are used in the following, these refer to the appended figures and not necessarily to an actual situation of use. The shown figures are schematic representations for which reason the configuration of the different structures as well as their relative dimensions are intended to serve illustrative purposes only.

Some of the different components are only disclosed in relation to a single embodiment of the invention, but is meant to be included in the other embodiments without further explanation.

FIG. 1 schematically illustrates an exemplary embodiment 100 of a characterization system in accordance with the present invention. Inlet valve 121 and an outlet valve 122 control flow of liquid in and out of a sample section 103. Valves 121 and 122 are placed in connection with piping 101 in fluid communication with a process plant piping system carrying ingredients or process plant products. FIG. 2 schematically illustrates such a connection. Inlet 111 and outlet 112 are connected to a process plant pipe 202 carrying for instance one or more process plant products and/or ingredient(s) 210.

The system furthermore comprises a measuring device 150 for optically characterizing a liquid sample confined in the sample section 103 between the inlet and outlet valves 121,122.

A pressurizer 130 can elevate the pressure on an inside of the piping 101 (i.e. in the sample section 103) between the inlet and outlet valves 121,122.

The characterization system furthermore contains an agitator 140 for agitating the liquid sample in the sample section 103. The agitator 140 may e.g. comprise one or more magnets that allow the agitator 140 to be rotated by use of an external magnetic driver e.g. based on principles known from electric motors, etc. The external driver may e.g. be placed outside the pipe 101, e.g. as illustrated in FIG. 9 or as explained in connection with FIG. 8.

FIG. 3 schematically illustrates an exemplary embodiment of a process for performing an optical characterization on a sample of liquid. In step 301, the inlet and outlet valves 121,122 are opened. Liquid is, in step 302, received into a sample section (see e.g. 103 in FIGS. 1 and 2) in a region between the two valves, for instance from a production line in a process plant. To secure the sample and allow for subsequent pressurization of the sample, the valves 121,122 are closed, in step 303. Next, in step 304, the pressurizer 130 is activated in order to increase the pressure in the sample section in order to put the liquid sample under pressure, typically in order to reduce the number and size of bubbles, if present in the liquid sample. Typically, the pressure is increased to more than 10 bar. When the pressure is around 40 bar, bubbles in many types of liquid samples are typically condensed and will no longer affect measurements significantly.

The applied pressure may vary according to and depending on the specific composition of the liquid sample and also to and on the temperature of the liquid sample where the aim is to dissolve ideally all gas or at least a sufficient amount of gas as governed by Henry's Law. The amount of gas to be dissolved may e.g. be estimated or derived by displacing liquids and measuring volumes as described in connection with FIG. 9 or in other applicable ways.

The present invention allows for a characterization of the sample as a homogeneous substance. The homogeneous state is obtained by agitating, in step 305, the sample using an agitator 140 such as shown e.g. in FIGS. 1 and 2 and preferably as shown in FIG. 8. The sample may comprise both liquid and solids, and typically the solids remain solid also during agitation. However, the agitation ensures that the optical characterization takes into account the presence of the solids. In a transmission or reflection or scattering characterization, solids will contribute to the result. However, if the solids are allowed to settle, the characterization may not reflect their presence, in particular if the analysis space in which the measuring device primarily measures does not include the region where solids settle. On the other hand, if the solids settle in relatively large quantities in the analysis space, the measurement might not correctly reflect the presence of liquid. Note that solids may settle in various different places, depending on their buoyancy. Some settle in the direction of gravity (sedimentation), while others settle in the opposite direction (floatation). Some particles might float in a suspended state. Solids may be inherent in the production line, or they may form between the two valves. In particular, a flocculation agent may be added as part of the process in order to change the optical properties of the sample.

Accordingly, during the agitation the optical characterization, as carried out at step 306, will provide results that reflect all or almost all particles, since particles are not allowed to settle, or at least allowed to settle less. The presence of two or more immiscible liquids may also result in skewed results, or at least results that do not correctly represent the presence of different liquid components. The agitation causes a homogenization of the sample components.

Note that "homogeneous" is not to be construed as meaning that liquids are emulsified or solids broken into pieces small enough not to be discernable. The liquid sample may strictly speaking be heterogeneous. The important aspect is that particles of solid matter or liquids that might collect or settle away from the measuring device in the absence of agitation are brought into the analysis space where they will affect the results of the optical characterization as performed by the measuring device at step 306. The purpose of the agitation is to mix the ingredients in the liquid sample well facilitating that preferably or substantially all or most ingredients and/or particles of the liquid sample will influence the characterization, not specifically to change their chemical and/or physical properties.

Traditional centrifugal agitators, stirrers, etc. will not provide an as homogeneous liquid as also elaborated upon in the following.

It is clear that the order of the steps in FIG. 3 can be varied to some extent. Some steps are at least for some periods concurrent, such as agitation, pressurization and characterization, but need not be at all times. For instance, the agitation may be initiated before pressurization is initiated. Also, the optical characterization can take place during elevating of the pressure. These and other variations are design options and may be implemented to suit the type of liquid, the purpose of the characterization and so on.

FIG. 3 also shows an optional step, 307, of performing the optical characterization at least one more time. The purpose of such a step might be to test whether the optical characterization result is reproducible. Another purpose might be to perform several measurements and calculate an average value in order to smooth out variations. For instance, a liquid sample containing large solid particles might give characterization results with large variations, for instance because a large piece of solid may reflect or absorb or scatter light to a particularly high and untypical degree. By performing several measurements, this effect and the variation it leads to, can be reduced.

FIG. 4 schematically illustrates an embodiment of the system having an inlet valve 421 that may connect not only to a production line that provides the liquid sample, but also to another reservoir via a conduit 411, allowing a flow 423 of for instance an agent. This agent might for instance be a solvent or a dilution agent or a flocculation agent. Such an inlet valve 421 may e.g. be a three-way valve as shown in FIG. 4. Alternatively, the reservoir may e.g. be connected as shown in FIG. 9 via (at least one) other inlet and valve. For instance, liquid from the production line might in some cases be virtually opaque or very dense. By mixing it with a dilution agent, such as water or alcohol or other appropriate substance, a more valuable characterization result can be obtained. A flocculation agent can also be used specifically for the purpose of improving sedimentation of certain components, for instance for the purpose of determining certain properties that are particularly identifiable in a light scattering measurement.

FIG. 5 schematically illustrates an embodiment having an outlet valve 522 that may connect not only with the production line, but also with for instance a sewer system (if the liquid is immediately disposable) or other container. Such an outlet valve 522 may e.g. be a three-way valve or single valves. Another application is to have at least part of the liquid sample go to a traceability facility. There, the liquid sample or part thereof can be collected and labeled. The label is (preferably uniquely) associated with the measurement results obtained based on the characterization of that particular liquid sample. At a later point, the sample can be evaluated further, if necessary.

The embodiments in FIGS. 4 and 5 (and FIG. 1 or 2 or 9) can readily be combined.

FIG. 6 schematically illustrates an alternative characterization process. Steps 301-306 from FIG. 3 are performed. Additionally, the agitation is stopped, step 607, and a second characterization is performed, step 608. When the agitation is stopped, certain solids or liquid components might tend to move in a certain direction and settle. For instance, certain solids might be pulled down by gravity and settle nearer to the ground while others due their buoyancy may flow up, out of the measuring device's reach. By performing several optical measurements, a time-resolved characterization can be obtained. Such a characterization will reflect the presence for instance of particles that tend to settle. This in itself is valuable information, and in combination with the optical characterization performed during agitation it helps characterize the liquid sample.

The process schematically illustrated in FIG. 7 comprises the steps of the process shown in FIG. 3. Furthermore, it shows that certain steps are repeated. For instance, the characterization results may be analyzed (step 707) and certain steps performed again in response to the analysis results. For instance, it may be desirable to characterize the liquid sample at multiple degrees of agitation, with step 305. Unexpected characterization results might be a reason to perform yet another measurement, with step 306. These additional steps may also be performed independently of data analysis. For instance, the system may by default perform multiple, such as 3 or 5 or 10, characterizations. This allows smoothing of the results to reduce the impact on the results from extraneous measurements that perhaps give otherwise misleading results.

In this way, a representative result can be determined based for instance on a suitable algorithm. Such an algorithm might for instance include one or more of: smoothing; averaging; disregarding certain results.

In some embodiments, the process may also comprise introduction of one or more given agents and/or one or more secondary liquids as described in connection with FIG. 9. These related steps may be carried out after step 707 and loop or iterate back as appropriate and described in connection with FIG. 9.

FIG. 8 schematically illustrates an agitator device generally in the form of a rotor 800. The rotor 800 as shown in FIG. 8 or similar is particularly suitable for being used and placed in a substantially vertical pipe section (preferably in the sample section; see e.g. agitator 140 placed in the sample section 103 in FIGS. 1-2, 4-5, and 9) where it can impart a force on the liquid sample. The agitator device 800 comprises a central pipe 801 with a (preferably central) through-going cavity 811, an outer cylindrical section 802, and one or more agitation or pressure elements 803 e.g. in the form of propeller, blade, etc. elements or the like. It comprises magnets 804 that allow the rotor to be rotated by use of an external magnetic driver e.g. based on principles known from electric motors, etc. The external driver may e.g. be placed outside the pipe 101, e.g. as illustrated in FIG. 9 or more preferably for this and corresponding embodiments of an agitator 800 near the magnets 804 (but still outside the pipe 101).

The central pipe 801—and thereby its central cavity 811—is oriented along the rotational axis of the rotor 800.

As mentioned and as will be explained further, such an agitator device 800 is particularly suitable for being used in a characterization system in accordance with the present invention e.g. as shown in FIGS. 1-2, 4-5, and 9 and/or by a characterization process e.g. as shown in FIGS. 3 and 6-7.

When the rotor 800 is rotated in one predetermined direction, a flow pattern of the liquid will be generated as generally indicated by arrows 810.

More particularly, the rotor when rotating will, due to an appropriate inclination of the propeller, blade elements, etc. and due to being located in an enclosure (i.e. the sample section; see e.g. 103 in FIG. 1, etc.), cause an inflow of liquid at the top of the outer cylindrical section 802 and a flow between the outer cylindrical section 802 and an upper (in the orientation of the Figure) part of the central pipe 801 and downwards (in the orientation of the Figure) generally parallel to the rotational axis of the rotor 800 or the central axis of the central cavity 811 (being coinciding or parallel axes, at least in some embodiments). Since liquid is drawn inside the upper (in the orientation of the Figure) part of the cylindrical section 802, an under- or negative pressure is created above the rotor causing liquid to be 'sucked up' at the lower (in the orientation of the Figure) part of the central pipe 801 flowing through the central cavity 811 and exiting from the upper (in the orientation of the Figure) part of the central pipe 801. Basically, the central pipe 801 with its central cavity 811 will more or less function as a straw.

Basically a flow pattern is provided inside the sample section that provides forces (upwards and downwards) that are generally parallel to the rotational axis of the rotor 800 and the vertical axis of the sample section (for embodiments where the sample section is generally a vertical cylindrical pipe or at least has a vertical extent being larger than its horizontal extent). This will ensure that all particles are brought in circulation in the sample section, generally regardless of their properties e.g. whether they are relatively heavy or light.

Even relative heavy particles will be brought in circulation and they may be moved even from locations near the bottom of the sample section where they otherwise would be. Additionally, relatively lighter particles are also brought in circulation and they may be moved from locations near/nearer the upper part of the sample section where they otherwise would be.

Furthermore, even quite heterogeneous fluids will be circulated.

Effectively, a substantially homogeneous state of the fluid (including potential particles) is provided.

This ensures that even the relatively heavy and/or relatively lighter particles will influence the characterization, which increases the reliability and the quality of the characterization.

Furthermore, the homogeneity enables reproducibility of measurements.

This is opposed to more traditional (magnetically driven) rotational agitators, stirrers, etc. commonly used in other characterization system. Such agitators, stirrers, etc. often comprising a number of blade elements, pill-shaped plastic container comprising a magnetic core and so on. Agitating a liquid e.g. with solid particles by rotating such traditional rotational agitators will generally force the liquid and solids (spiraling) outwards from a central axis towards the walls of the container or sample section, i.e. by generally planar circulation with the relatively lighter particles being moved further away than the relatively heavy particles. Such agitators may also have more limited abilities related to moving the relatively lighter particles down and/or relatively heavy particles up from (near) the bottom.

This poses an issue, especially in connection with optical characterization since the measurement may be heavily influenced by the particular composition of (especially heterogeneous) liquid components and/or location of particles of different sizes or mass.

This also gives challenges in respect of reproducibility—even for a same or similar liquid—which may cast doubt about the correctness of obtained measurements (as it is hard to re-produce them).

Agitating the liquid according to the present invention and as described above will not have these issues or at least have them to a lesser extent.

The length of the agitator device 800, or more specifically the length of the central pipe 801, may be designed or adapted for a specific use preferably so that the one or more agitation or pressure elements 803 is located so that it influences the measurement or characterization zone.

As a note, if the rotor is rotated in the opposite direction, the flow pattern will generally be reversed compared to the one shown in FIG. 8. This will also work sufficiently, due to the relatively enclosing volume of the pipe/sample section. As another note, a different appropriate inclination/orientation of the propeller, blade elements, etc. will also cause a reversed flow pattern (for the same predetermined rotational directions as given above).

FIG. 9 schematically illustrates an alternative embodiment of a system for performing optical characterization of a liquid sample. FIG. 9 corresponds to FIG. 4 with some additional details.

Shown is a characterization system 100 corresponding to the characterization system and embodiments thereof shown and explained in connection with FIGS. 1-2 and 4-5 except as explained in the following.

The characterization system 100 is connected to a process plant pipe 202 carrying for instance one or more process plant products and/or ingredient(s) via an inlet 111 comprising an inlet valve 121 and outlet 112 comprising an outlet valve 122. A pipe or similar 101 comprising a sample section 103 being located between the inlet and outlet valves 121, 122 respectively.

The system 100 further comprises a measuring device 150, a pressurizer 130, and an agitator 140 for agitating the liquid sample in the sample section 103 just as in FIGS. 1, 4, and elsewhere.

However, according to the shown and similar embodiments, the system 100 further comprises—or is connected to—at least one additional chamber, container, reservoir, or the like 103' (forth only referred to as additional chamber). The additional chamber 103' is connected to the sample section 103 via a further inlet valve 421 allowing the controlled introduction of a flow 423 of one or more given agents and/or one or more secondary liquids as will be elaborated upon further down. In other embodiments, the inlet valve 121 and the further inlet valve 421 may be replaced by a three-way valve having a port connected to the sample section 103.

Preferably, the additional chamber 103' is connected to the sample section 103 near the agitator 140—e.g. as shown in FIG. 9—thereby allowing efficient mixing of the liquid sample and the agent(s).

In some embodiments, and as shown, the additional chamber 103' also comprises a pressurizer 130 that may be identical or similar to the pressurizer of the sample section 103. Alternatively, it may be different.

Finally, the additional chamber 103' may be connected to a supply or source of the given agent(s) via yet a further inlet valve 421. The agent(s) may e.g. be one or more selected from the group of a dilution agent, a contrast agent, a catalytic agent, a chemical reaction agent, etc.

The volume of the additional chamber 103' may e.g. be of a similar size as the volume of the sample section 103—or even a bit larger as shown.

The provision of one (or more) additional chambers 103' enables optical characterization of even opaque or nearly non-transparent liquids since it is possible to introduce relatively large quantities (relative to the volume of the liquid sample) of one or more agents or secondary liquids enabling relative large mixing ratios in a controllable way.

In the following, some embodiments of mixing a liquid sample and one or more agents or secondary liquids as part of a feedback loop, e.g. using a system or setup as shown in FIG. 9, will be described.

Initially, a liquid sample has been provided at the sample section and an optical characterization (including agitation as described) is performed as explained elsewhere and a suitable program, algorithm, etc. determines whether it would beneficial to add one or more secondary liquids or agents (e.g. a dilution agent or a contrast agent or a catalytic agent or a chemical reaction agent, etc. or mixtures thereof) according to one or more predetermined parameters and/or criteria. The one or more predetermined parameters and/or criteria may e.g. determine whether the result obtained by the optical characterization is e.g. "out of range" for the given used optical characterization system. In such a case, a relative high volume of a dilution agent is introduced.

If yes it would be beneficial then at a first step, the liquid sample and the one or more secondary liquids or agents are pressurized using two or more pressurizers 130 (one pressurizer for the liquid sample and one or more for the one or more secondary liquids or agents) and each respective volume is determined by an appropriate sensor (e.g. such as magnetic linear contactless length measuring systems as generally known or any other appropriate sensors e.g. mounted on actuators, pistons, etc. of the pressurizers 130; knowing the size of the actuators or piston it is possible to precisely determine the volumes and displaced volume—see below).

The connection between the sample section 103 and the additional chamber 103' may be closed during this step.

At a next step, the pressurization ceases.

At a next step, an appropriate amount of the liquid sample is displaced while the liquid sample is in a substantially homogeneous state (as provided by using the agitator 130) so it is a substantially homogeneous liquid that is displaced. Preferably the agitator 130 is also active during the actual displacement.

An appropriate scheme, algorithm, etc. may determine the appropriate amount to be displaced. If the initial optical characterization only succeed partly it is possible to determine or derive an amount to displace. If the optical characterization did not succeed, iterations are made e.g. starting with displacing 50% or another amount until optical characterization succeeds (at least partly).

The displaced amount may be, if needed or preferred, so large that even only about 5% of the original liquid sample is present. The arrangement of FIG. 9 readily facilities this in a highly controllable manner.

The amount of the liquid sample may e.g. be displaced via the outlet valve 122 or to a disposal facility e.g. according to FIG. 5.

At a next step, the volume of the liquid sample is determined again while applying pressure by a pressurizer as already described.

At a next step, the one or more secondary liquids or agents is introduced into the sample section 103 filling the space made available due to the displacement resulting in a mixed (and e.g. diluted) liquid sample.

At a next step, the liquid sample and the one or more secondary liquids or agents are pressurized again using the pressurizers 130 and each respective volume is determined by the appropriate sensor(s). This enables precise determination of the respective concentrations of the sample liquid and the one or more agents or secondary liquids in the mixed sample liquid. The determined concentrations may be used as part of an initial step, for use for the next optical characterization, calibration, etc.

Finally, optical characterization is performed (including agitation as described) as explained elsewhere is performed for the mixed liquid sample.

Again, based on the characterization results, it is determined whether it would beneficial to add more of the one or more secondary liquids or agents. If yes, the steps are repeated again until the optical characterization results are satisfactory. If not, the optical characterization results are satisfactory and reported and stored accordingly including the results.

This process may e.g. be implemented as part of the feedback loop process as shown in FIG. 7.

As mentioned, more than two chambers may be used to add different chemical agents that alone or in combination may be useful in deriving further characteristics of the sample liquid.

In this description, the term "connected to" shall not be construed as implying that no further elements are placed between the parts connected. For instance, a line pipe may be connected to the inlet valve, whereby the inlet valve controls the flow of liquid from the line pipe into the sample section. However, another valve may be placed between the line pipe and the inlet valve. Such a valve might be a backup valve for allowing maintenance of the inlet valve. Yet, the line pipe and inlet valve are still connected in a way that allows a flow from the line pipe through the inlet valve (and into the sample section). Accordingly, embodiments having additional elements that are not essential to the operation of the present invention and do not render its operation impossible do fall within the scope of the claims.

It should be understood that certain embodiments or aspects of the different figures may be combined to effect.

Some preferred embodiments have been shown in the foregoing, but it should be stressed that the invention is not limited to these, but may be embodied in other ways within the subject matter defined in the following claims.

In the claims enumerating several features, some or all of these features may be embodied by one and the same element, component or item. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A characterization system for performing optical characterization of a liquid sample in a process plant, comprising
   a sample section for holding the liquid sample,
   an inlet comprising an inlet valve adapted to control a flow of the liquid sample into the sample section, an outlet comprising an outlet valve adapted to control a flow of the liquid sample out of the sample section, a pressurizer adapted to pressurize the sample section, an agitator adapted to agitate at least a part of the liquid sample inside the sample section when the sample section is pressurized by the pressurizer, a measuring device adapted to perform optical characterization of the liquid sample inside the sample section while the liquid sample is pressurized and agitated, where the optical characterization is performed during or after agitation by the agitator, wherein the inlet valve and the outlet valve are connected to a line pipe and the characterization system is adapted to receive the liquid sample from the line pipe through the inlet valve, characterize the liquid sample in the sample section, and optionally return at least a part of the liquid sample to the line pipe through the outlet valve, wherein the agitator comprises an open pipe element rigidly connected to a pressure element, the pressure element producing a pressure force having a non-zero force component parallel to a rotation axis of the agitator when the agitator is submerged in a liquid and rotating around the rotation axis.

2. The system in accordance with claim 1, wherein the sample section comprises a substantially vertical pipe section.

3. The system in accordance with claim 2, wherein the agitator is placed in a lower half of the substantially vertical pipe section in such a way that by agitating the liquid sample with the agitator, at least some solid particles, if present in the liquid sample, are prevented from settling during the optical characterization.

4. The system in accordance with claim 3, wherein a part of the agitator is placed less than 5 cm from a lowest end of the substantially vertical pipe section.

5. The system in accordance with claim 1, wherein the pressurizer is adapted to pressurize the sample section to at least 10 bar.

6. The system in accordance with claim 1, wherein the inlet valve and/or the outlet valve is/are a three-way valve.

7. The system in accordance with claim 1, wherein the sample section is connected to a dilution agent reservoir or cleaning agent reservoir or flocculation agent reservoir or contrast agent reservoir or a catalytic agent reservoir or a chemical reaction agent reservoir.

8. The system in accordance with claim 1, wherein the sample section is connected to a traceability facility, the traceability facility being capable of receiving and storing at least a part of the liquid sample in connection with a unique identifier uniquely associated with optical characterization data obtained from the optical characterization performed on the liquid sample.

9. The system in accordance with claim 1, wherein the open pipe element is a central pipe having a through-going cavity, and wherein the agitator comprises an outer cylindrical section enclosing the central pipe at a first upper end, and a number of magnets allowing the agitator to be rotated by use of a magnetic external driver, and wherein the pressure element is adapted to provide a flow pattern generally parallel to the rotation axis of the agitator when the agitator is rotated via the magnetic external driver, wherein the central pipe and the through-going cavity are oriented along the rotation axis of the agitator.

10. The system in accordance with claim 1, wherein at least one chamber is connected to the sample section via a further inlet valve allowing controlled introduction of a flow of one or more given agents and/or one or more secondary liquids wherein the at least one chamber comprises a pressurizer adapted to pressurize a liquid in the at least one chamber.

11. The system in accordance with claim 1, wherein the sample section comprises a substantially horizontal or inclined pipe section.

12. The system in accordance with claim 1, wherein the pressure element includes one or more propelling blades for converting a part of the agitator's rotational energy to kinetic energy in the liquid sample.

13. A process for performing optical characterization of a liquid sample in a process plant, comprising:

opening an inlet valve and an outlet valve, receiving the liquid sample into a sample section between the inlet valve and the outlet valve, closing the inlet valve and the outlet valve, pressurizing an inside of the sample section when the liquid sample is held in the sample section, agitating, using an agitator, the liquid sample held in the pressurized sample section, wherein the agitator includes an open pipe element rigidly connected to a pressure element that produces a pressure force having a non-zero force component parallel to a rotation axis of the agitator in response to the agitator being submerged in a liquid and rotating around the rotation axis, performing a first optical characterization of the liquid sample held in the pressurized sample section while the liquid sample is agitated by the agitator.

14. The process in accordance with claim 13, further comprising:

performing a second optical characterization while the liquid sample is in a state with a lesser degree of agitation than under the first optical characterization by stopping agitation before and/or during the second optical characterization.

15. The process in accordance with claim 13, further comprising:

performing a second optical characterization adapted to characterize a sedimentation and/or a flocculation process in the pressurized liquid sample.

16. The process in accordance with claim 13, responsive to determining to add one or more secondary liquids or agents from one or more additional chambers after the steps of claim 13 have been performed as an initial step, the method further comprising:

pressurizing the one or more secondary liquids or agents, determining a volume of the liquid sample in the sample section and a volume of the one or more secondary liquids or agents in the one or more additional chambers and afterwards ceasing pressurization, displacing a predetermined amount of the liquid sample in the sample section while the liquid sample is in a substantially homogeneous state, determining the volume of the liquid sample again while applying pressure, introducing the one or more secondary liquids or agents into the sample section so as to fill a space made available due to the displacement, resulting in a mixed liquid sample, pressurizing the sample section to pressurize the mixed liquid sample, determining a volume of the pressurized mixed liquid sample and afterwards ceasing pressurization, performing optical characterization of the mixed liquid sample.

17. The process in accordance with claim 13, wherein the open pipe element is a central pipe having a through-going cavity, and wherein the agitator comprises an outer cylindrical section enclosing the central pipe at a first upper end, and a number of magnets allowing agitator to be rotated by use of a magnetic external driver, and wherein the pressure element is adapted to provide a flow pattern being generally parallel to the rotation axis of the agitator when the agitator is rotated via the magnets, wherein the central pipe and the through-going cavity are oriented along the rotation axis of the agitator.

* * * * *